US010368057B1

(12) United States Patent
Saran et al.

(10) Patent No.: US 10,368,057 B1
(45) Date of Patent: Jul. 30, 2019

(54) SYNCHRONIZING DATA STREAMS

(71) Applicant: Amazon Technologies, Inc., Seattle, WA (US)

(72) Inventors: Sajesh Kumar Saran, Bothell, WA (US); Brad Nathaniel Arnold, Bellevue, WA (US); Jack G Song, Maple Valley, WA (US); Tyler Ogren Vrooman, Seattle, WA (US); Wei Chen, Sammamish, WA (US); Todd Nelson Schoepflin, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 15/279,212

(22) Filed: Sep. 28, 2016

(51) Int. Cl.
*H04N 13/296* (2018.01)
*G11B 27/10* (2006.01)
*H04N 9/04* (2006.01)
*H04N 5/12* (2006.01)
*H04N 13/257* (2018.01)
*H04N 13/275* (2018.01)

(52) U.S. Cl.
CPC ........... *H04N 13/296* (2018.05); *G11B 27/10* (2013.01); *H04N 5/123* (2013.01); *H04N 9/045* (2013.01); *H04N 13/257* (2018.05); *H04N 13/275* (2018.05)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 9,911,290 B1* | 3/2018 | Zalewski | G07G 1/0072 |
| 2011/0267344 A1 | 11/2011 | Germann et al. | |
| 2013/0284806 A1 | 10/2013 | Margalit | |
| 2013/0286012 A1 | 10/2013 | Medioni et al. | |
| 2015/0036047 A1* | 2/2015 | Bledsoe | H04N 5/2254 |
| | | | 348/375 |
| 2017/0180708 A1 | 6/2017 | Hazeghi et al. | |
| 2017/0324949 A1* | 11/2017 | Chen | H04N 13/254 |
| 2018/0088584 A1 | 3/2018 | Tascione et al. | |

* cited by examiner

*Primary Examiner* — Heather R Jones
(74) *Attorney, Agent, or Firm* — Lee & Hayes, P.C.

(57) ABSTRACT

This disclosure describes techniques for synchronizing independent data streams. In some instances, a computing device couples to multiple independent sensors, such as cameras, and applies accurate timestamp information to the individual frames of sensor data from the independent sensors. After aligning these data streams by applying these accurate timestamps, the computing device may, in some instances, encode and transmit these timestamped data streams to one or more entities for further processing. In one example, a first camera (e.g., a depth camera configured to generate a depth map) may capture images of an environment, as may a second camera (e.g., an Red-Green-Blue (RGB) camera configured to generate color images). The resulting images may be temporally aligned with one another via the timestamping, and the resulting aligned images from both the depth sensor and the RGB camera may be used to create a three-dimensional (3D) model of the environment.

18 Claims, 7 Drawing Sheets

SYNCHRONIZING DATA STREAMS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for synchronizing independent sources of data. In some instances, one or more computing devices may couple to multiple independent sensors, such as cameras, weight sensors, audio sensors, or the like, and may apply accurate timestamp information to the individual frames of sensor data from the independent sensors. After aligning these data streams by applying these accurate timestamps, the one or more computing devices may, in some instances, encode and transmit these time-stamped data streams to one or more entities for further processing. In one example, a first camera (e.g., a depth camera configured to generate a depth map) may capture images of an environment, as may a second camera (e.g., an Red-Green-Blue (RGB) camera configured to generate color images). The resulting images (e.g., video) may be temporally aligned with one another via the timestamping, and the resulting aligned images from both the depth sensor and the RGB camera may be used to create a three-dimensional (3D) model of the environment.

As described in detail below, the techniques may utilize timestamp queues to accurately apply timestamps to independent data streams captured by sensors coupled to a common computing device. It is noted, however, that while the following description discusses two data sensors, specifically cameras, the techniques may apply to any other type of sensor and to any number of homogeneous or heterogeneous sensors. In some instances, each camera couples to a computing device via a respective interface, such as a universal serial bus (USB) interface, MIPI camera serial interface (CSI), a display serial interface (DSI), a high-definition multimedia interface (HDMI), a wireless interface, and/or the like. Further, each independent camera may utilize a respective device driver that is executable on the one or more computing devices. Therefore, when the example first camera captures an image, the first camera may provide the image to its device driver for processing. Similarly, when the second camera captures an image, the second camera may provide this image to its device driver for processing.

Because these cameras couple to the one or more computing devices via different interfaces, which may require communicating via different protocols, the amount of time needed to process these different images may vary. That is, the amount of time for an image from a first sensor to makes its way through the processing pipeline may differ from that of an image acquired by a second sensor due to camera processing, data transfer delay by the transfer rate of the interfaces (e.g., USB versus CSI, etc.), driver processing delay, (e.g., raw video frame assembly, etc.) and jitter due to non-real time reading of frames.

In order to synchronize these data streams, the techniques described below use timestamp queues to reliably apply timestamps to each frame received from a respective driver. In the above example of a depth sensor and an RGB camera, the techniques may create a first timestamp queue for use with the images acquired by the depth sensor and a second timestamp queue for use with the images acquired by the RGB camera. In addition, the techniques may configure both the depth sensor and the RGB camera to operate in trigger mode, where an external trigger received by the respective sensor causes the sensor to acquire a single image and send it to the sensor's respective driver.

In some examples, the external trigger comprises a pulse generated by hardware, firmware, or software. For instance, the techniques may utilize a hardware-based pulse-width-modification (PWM) unit that generates periodic pulses that, when received by a respective sensor, cause the sensor to acquire a frame of data. Of course, while some instances utilize the PWM unit, a trigger signal may be generated using any of type of trigger unit implemented in other types of hardware, software, or a combination thereof. Further, the rate of the pulse and the implementation of the particular trigger unit used to generate the pulses may vary based on the requirements of the application that will ultimately use the aligned data streams. Regardless of whether the trigger unit is embodied in hardware or software, in some instances each sensor (e.g., the depth sensor and the RGB camera in the current example) may couple to the same output line of the trigger unit. By coupling the sensors to the trigger unit in this manner, each sensor receives the periodic pulses at a same time, resulting in each sensor acquiring a frame of data (e.g., an image) substantially contemporaneously with one another.

In addition to setting up a timestamp queue for each sensor, the techniques sets up an interrupt service that is configured to generate timestamp data and store this data in each respective timestamp queue. As described further below, in response to the PWM unit or other trigger generating a pulse, an interrupt is also generated and received by the processor of the computing device, which in turn invokes the interrupt service. When the interrupt service is called, this service acquires the current time and stores this current time as a timestamp in each respective queue. The interrupt service couples to the same output line of the PWM unit as the sensors, such that when the PWM unit generates a pulse, the interrupt service receives the interrupt substantially contemporaneously with the pulse being received by the sensors. The interrupt service then generates a first timestamp specifying the current time (i.e., the time at which each sensor acquired the current frame) and stores this first timestamp in the first timestamp queue. In addition, the interrupt service generates a second timestamp also specifying the same, current time and stores this second timestamp in the second timestamp queue.

A synchronization application, stored in memory of the one or more computing devices, then awaits receiving the respective data frames from the respective drivers. Upon receiving the first image from the depth sensor, in this example, the application acquires the first timestamp from the first timestamp queue and associates this timestamp with the first image from the depth sensor. That is, the first timestamp queue operates as a first-in-first-out (FIFO) queue, such that the application takes the next timestamp "in line" and associates it with the first image. This may include storing the timestamp as metadata as part of the image, such as in a header portion of the image file. Further, the timestamp information may be added to the image using any other type of embedded metadata techniques or may be added by storing the metadata externally to but in association with the image. In either instance, the metadata is used to identify the timestamp value associated with the respective image, whether determined by analyzing a header or other structural portion of the image, or by identifying a location of the metadata for a particular image stored external to the image.

Similarly, when the synchronization application receives the image acquired by the RGB camera, the synchronization application may acquire the second timestamp specifying the same time as the first timestamp from the second timestamp queue and may associate this second timestamp with the RGB image. Again, the second timestamp queue may operate as a FIFO queue, such that the synchronization application acquires the timestamp that is next in line. Again, the second timestamp may be stored as metadata in association with the RGB image (e.g., as part of a header of the image file). It is noted that because of the potential processing delays between the depth driver and the RGB driver, the synchronization application may receive the depth images earlier or later than the RGB images. However, using the respective timestamp queues, the techniques may ensure that these images may be accurately timestamped and, thus, may be accurately aligned with one another using the timestamp information. Therefore, applications further down the processing pipeline may rely on these data streams being accurately synchronized with one another.

In some instances, the synchronization application may determine when to restart the synchronization process, such as due to frames being dropped, or the like. In this regard, the synchronization application may utilize an algorithm that determines when to restart the process based on the current state of the first timestamp queue and the current state of the second timestamp queue. For instance, this algorithm may take into account the differential between the amount of timestamps in each queue as well as the amount of time that these queues have had a differential. That is, if the queues have a same number of timestamps stored at a particular time, then the algorithm may determine that the process is healthy. If, however, the algorithm calculates that a large disparity exists in the number of stored timestamps in one queue relative to the other and/or that a differential has existed for a relatively long amount of time, then the process may be determined to need restarting. It is to be appreciated that the amount of imbalance between the queues and the amount of time may vary depending upon implementation details.

When the synchronization application determines to restart the synchronization process, the synchronization application may send a first instruction to the PWM unit to cease generating pulses—and, hence, ceasing the sensors from capturing further data frames. The synchronization application may then empty each queue (e.g., delete the contents of the first and second timestamp queues, delete and re-generate the first and second timestamp queues, etc.), empty or flush data lines between the sensors and the computing device, and, thereafter, may send a second instruction to the PWM unit to again begin generating pulses.

As will be appreciated, the described timestamp-queue techniques absorb inter-stream and intra-stream processing delay variations in the system by providing manner for real-time application of accurate timestamps to the data frames coming from independent sensors. The correct timestamping of individual frames improves synchronization of multiple data streams later in the processing pipeline.

While the examples described herein discuss the techniques applied to synchronizing videos, it is to be appreciated that the techniques may be used to synchronize any other type of data streams. Further, while a few example environments in which the techniques may be implemented are described below, it is to be appreciated that these are merely illustrative and that any other similar or different environments may implement the described techniques.

Further, while the above introduction describes synchronizing data streams, in other instances the techniques may apply to synchronizing sources of data provided by sensors in a non-streaming manner. Streaming, meanwhile, is sending data (e.g., a video stream) as a steady continuous flow, which allows for playback of the data while subsequent data in the stream is being received. To stream video data, the sending device may utilize an encoder to compress the video data and the receiving client may utilize a decoder to decode the streamed video data to allow for playback. In order to ensure that the client is able to playback the streamed video data continuously, the sending device may stream the video data at a constant or variable bit rate that is at least slightly less than the bandwidth capacity of the client.

Streaming involves protocols at several different layers, including the transport layer, the session layer, the presentation layer, and the application layer. The transport layer is responsible for getting data from one location to the other—in this instance from the sending device to the client. The session layer organizes the streamlining activity into corresponding ongoing unit, while the presentation layer manages the bridge between the information as seen by the receiving application at the client and the information that is sent over the network from the host server. The application layer is the level at which the sending and receiving applications talk to the network. In order to ensure timely delivery of the video data, the host server may utilize a User Datagram Protocol (UDP), which puts a premium on continuous delivery of information, rather than resending lost packets, as is typical for TCP communications.

In some instances, the sending device may utilize one or more Real Time Transport Protocols (RTPs), which is built atop UDP and is designed specifically for real-time data transfers. The RTP protocol operates at the transport layer and is closely associated with the Real-Time Control Protocol (RTCP), which operates at the session layer. The primary purpose of RTCP is to provide feedback on the quality of the data transport to allow modifications to the streaming, such as the adjusting of a bit rate. The Real-Time Streaming Protocol (RTSP) is a presentation-level protocol that allows for network controls, such as pause, play, and stop of the streamed video data. The RTP operating on the transport layer, the RTCP operating on the session layer, and the RTSP operating on the presentation layer is often collectively referred to "RTSP". Further, while one example has been described, it is to be appreciated that other streaming protocols can be utilized herein, such as Real Time Messaging Protocol (RTMP), Adaptive Bitrate Streaming, HTTP Live Streaming, Adobe® HTTP Dynamic Streaming, and the like.

Figure 1:
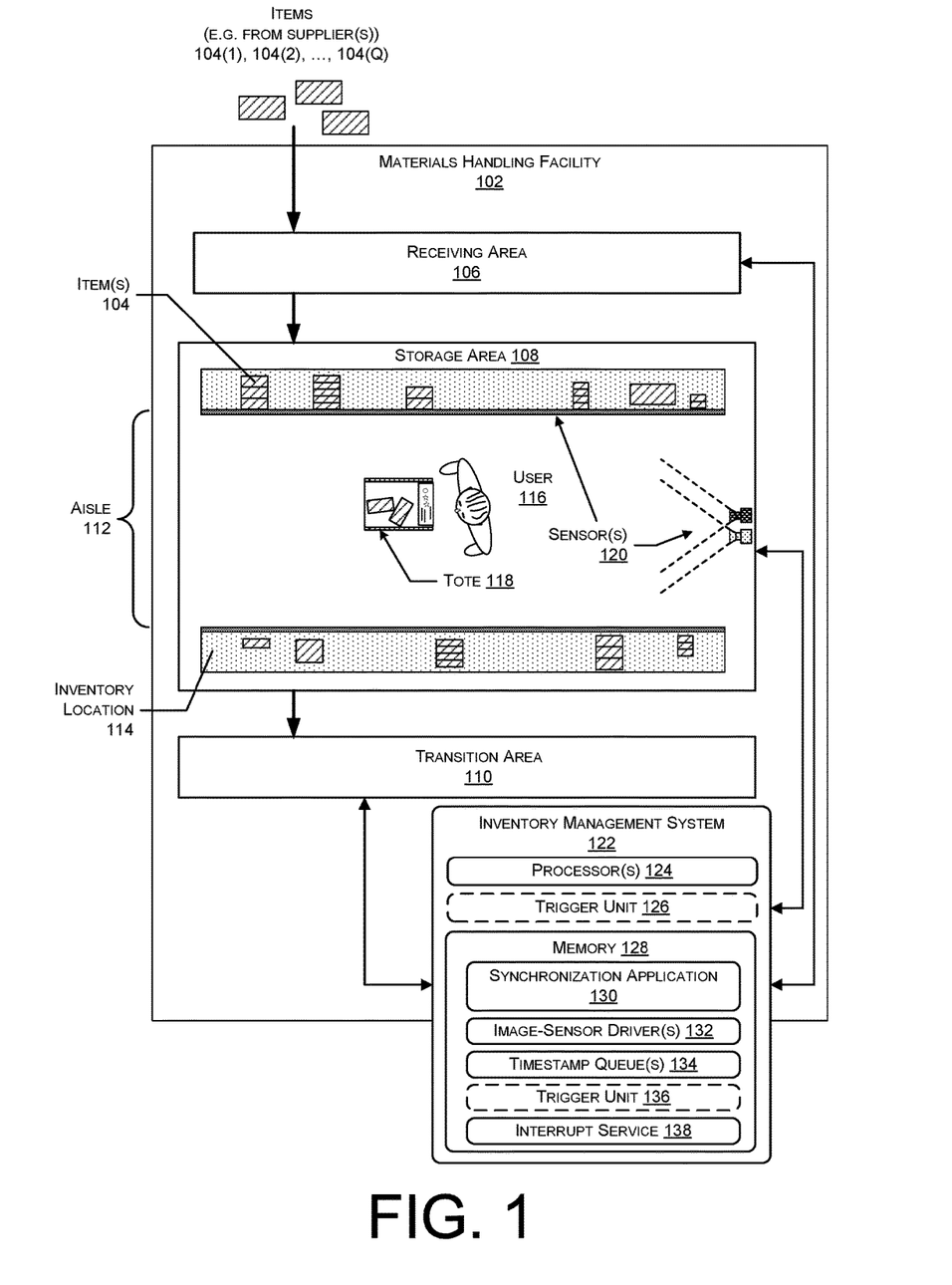
FIG. 1 is a block diagram illustrating a materials handling facility (facility) configured to use sensors, such as cameras.

FIG. 1 is a block diagram illustrating a materials handling facility (facility) configured to use sensors, such as cameras. A materials handling facility 102 (facility) may comprise one or more physical structures or areas within which one or more items 104(1), 104(2), . . . , 104(Q) may be held. As used in this disclosure, letters in parenthesis such as "(Q)" indicate an integer value. The items 104 may comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, weight sensors, cameras, proximity sensors, radio frequency (RF) receivers, microphones, temperature sensors, humidity sensors, vibration sensors, and so forth. In the illustrated example, the sensors include two cameras adjacent to one another, such as a depth sensor and an RGB camera that are used to generate a 3D model of the environment for tracking objects (e.g., items, users, etc.) through the environment. The sensors 120 may be stationary or mobile, relative to the facility 102. For example, the inventory locations 114, the totes 118, or other devices such as user devices, may contain sensors 120 configured to acquire sensor data. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. For instance, the inventory management system may determine when a user picks an item from the inventory locations 114 and, in response, may update a virtual shopping cart associated with the respective user. For instance, if the illustrated user 116 removes a bottle of ketchup from a shelf in the facility 100, one or more sensors may indicate the removal of the item and the inventory management system 122 may store an indication that the virtual shopping cart of the user 116 includes a bottle of ketchup.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

The inventory management system 122 may comprise one or more computing devices (e.g., servers) and, as illustrated, may include one or more processors 124, a hardware-based trigger unit 126, and memory 128. The memory 128 (and other memory described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 128 may be implemented as non-transitory computer-readable storage media ("CRSM"), which may be any available physical media accessible by the processor(s) 112 to execute instructions stored on the memory 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 124.

As illustrated, the memory 128 may store a synchronization application 130, one or more image-sensor drivers 132 (and/or other sensor drivers), one or more timestamp queues 134, a software-based trigger unit 136, and an interrupt service 138. As the dashed line indicates, in some instances the inventory management system 122 may utilize the hardware-based trigger unit 126, while in other instances the system 122 may additionally or alternatively utilize the software-based trigger unit 136. In either instances, the trigger unit may be configured to generate periodic pulses that, when received by the example cameras, cause the cameras to acquire an image and send the image to each sensor's corresponding driver 132. In addition, a pulse generated by the trigger unit may also trigger an interrupt, resulting in the calling of the interrupt service 138. When called, the interrupt service 138 may generate a timestamp for each queue 134, with each timestamp specifying the current time (which also represents the time that the cameras captured each timestamp specifying the current time (which also represents the time that the cameras captured each respective image) and may store a respective timestamp in each respective queue. When the drivers 132 are finished processing their respective images, the synchronization application 130 may receive each image, acquire the next-in-line timestamp from the appropriate timestamp queue, and append this timestamp to the particular image.

For example, in instances where the system 122 includes the hardware-based trigger unit 126, an output pin of the trigger unit 126 may couple to respective trigger pins of respective sensors (e.g., cameras). When the trigger unit 126 generates a pulse, the cameras may receive each the pulse and generate sensor data (e.g., respective images). Furthermore, the output pin of the trigger unit 126 may couple to a particular interrupt line of the processors 124. Furthermore, the particular interrupt line may be associated with the invocation of the interrupt service 138 using the interrupt-service framework provided by the processor 124. That is, the interrupt-service framework may be used to store an indication that the interrupt service 138 is to be called upon the processor 124 receiving an interrupt from the particular interrupt line that is coupled to the trigger unit 126. Therefore, when the trigger unit 126 generates a pulse, an interrupt may be received at the processor 124 along the particular interrupt line that couples the trigger unit 126 to the processor 124. The processor 124 may reference the interrupt-service framework to determine to make a call to the interrupt service 138, which may store the timestamp data in the respective queues in response to being called.

In some instances, aligning these video streams via application of accurate timestamps to the independent cameras allows for creation of a 3D video of the environment that allows items to be tracked within the facility 102. For instance, the 3D video may be analyzed to determine that the user 106 has picked a particular item (e.g., the ketchup bottle) from the shelf, such that the item may be added to the user's virtual cart. In some instances this aligned video may be analyzed in unison with other sensor data, such as data from the weight sensors or the like.

Figure 2:
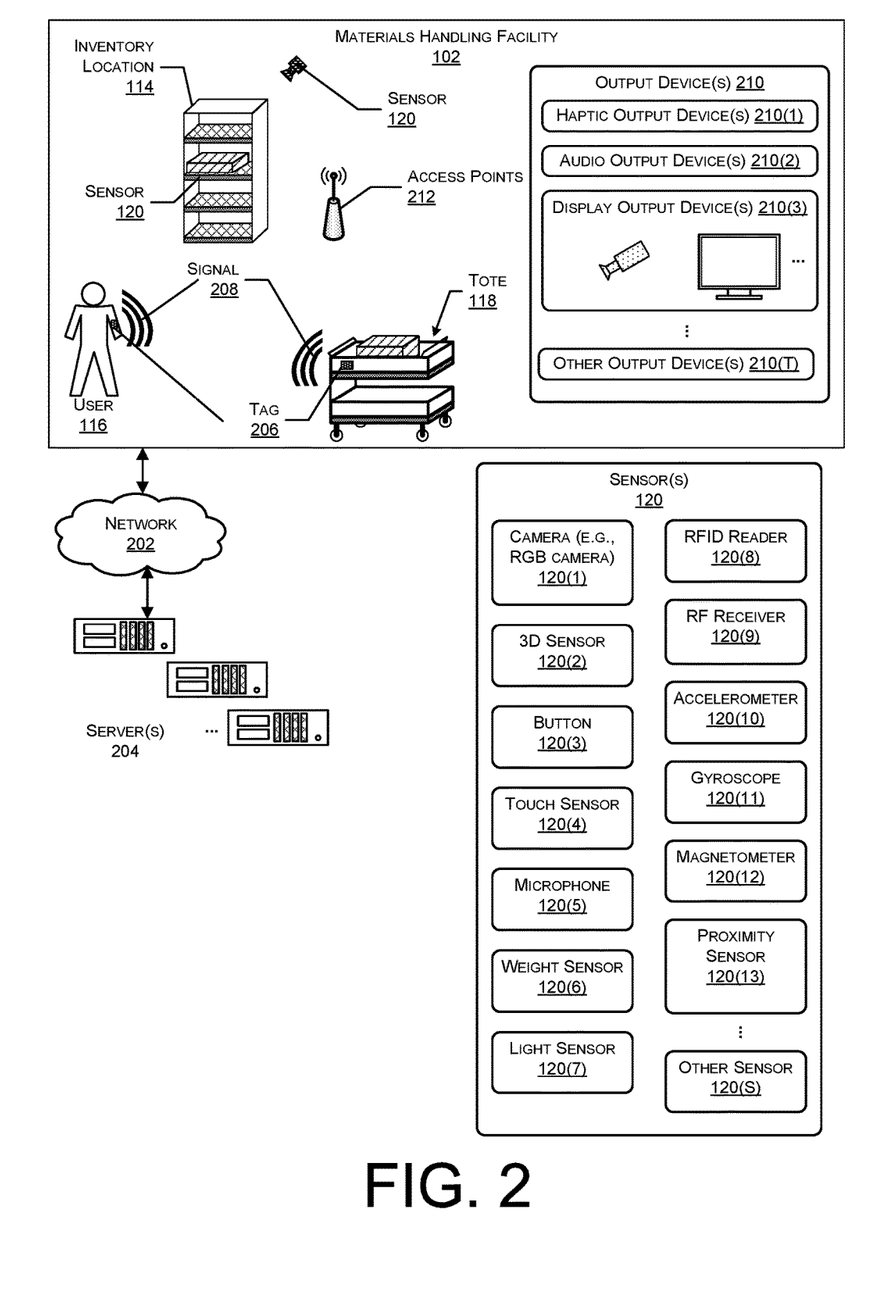
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The facility 102 may include one sensors 120, such as cameras, scale devices, and the like. The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and be used to determine identity and location. Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more cameras 120(1), such as RGB cameras. These cameras 120(1) may be configured to acquire images of a scene. The cameras 120(1) may be configured to detect light in one or more wavelengths including, but not limited to, terahertz, infrared, visible, ultraviolet, and so forth. The inventory management system 122 may use image data acquired by the cameras 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor field of view. The 3D sensors 120(2) may include depth sensors implemented as range cameras, time-of-flight sensors, lidar systems, sonar systems, radar systems, structured light systems, stereo vision systems, optical interferometry systems, coded aperture systems, and so forth.

The inventory management system 122 may use the three-dimensional data, potentially in combination with the camera data, to identify objects, determine one or more of a location, orientation, or position of an object. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account, configuration settings for a device, and so forth.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu, one or more particular items 104 for picking.

One or more microphones 120(5) may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load on a platform, such as the weight of an item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, load cells, pneumatic pressure sensors, and so forth. The sensing mechanisms may operate as transducers that generate one or more signals based on an applied force, such as that of the load due to gravity. The inventory management system 122 may use the weight data to identify an object, determine a location of an object, maintain shipping records, and so forth. For example, the weight sensor 120(6) at a particular location in the facility 102 may report a weight of the user 116, indicating the user 116 is present at that location.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi™, Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects or devices may be equipped with a gyroscope 120(11) to provide data indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data 130 indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a camera 120(1). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth. In some implementations, a proximity sensor 120(13) may be installed at the inventory location 114.

The sensors 120 may include other sensors 120(S) as well. For example, the other sensors 120(S) may include ultrasonic rangefinders, thermometers, barometric sensors, hygrometers, vibration sensors, or biometric input devices. Continuing the example, the biometric input devices may include, but not limited to, fingerprint readers, palm scanners, and so forth.

The facility 102 may include one or more access points 212 configured to establish one or more wireless networks. The access points 212 may use Wi-Fi™, NFC, Bluetooth®, or other technologies to establish wireless communications between a device and the network 202. The wireless networks allow the devices to communicate with one or more of the inventory management system 122, the sensors 120, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as a camera 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
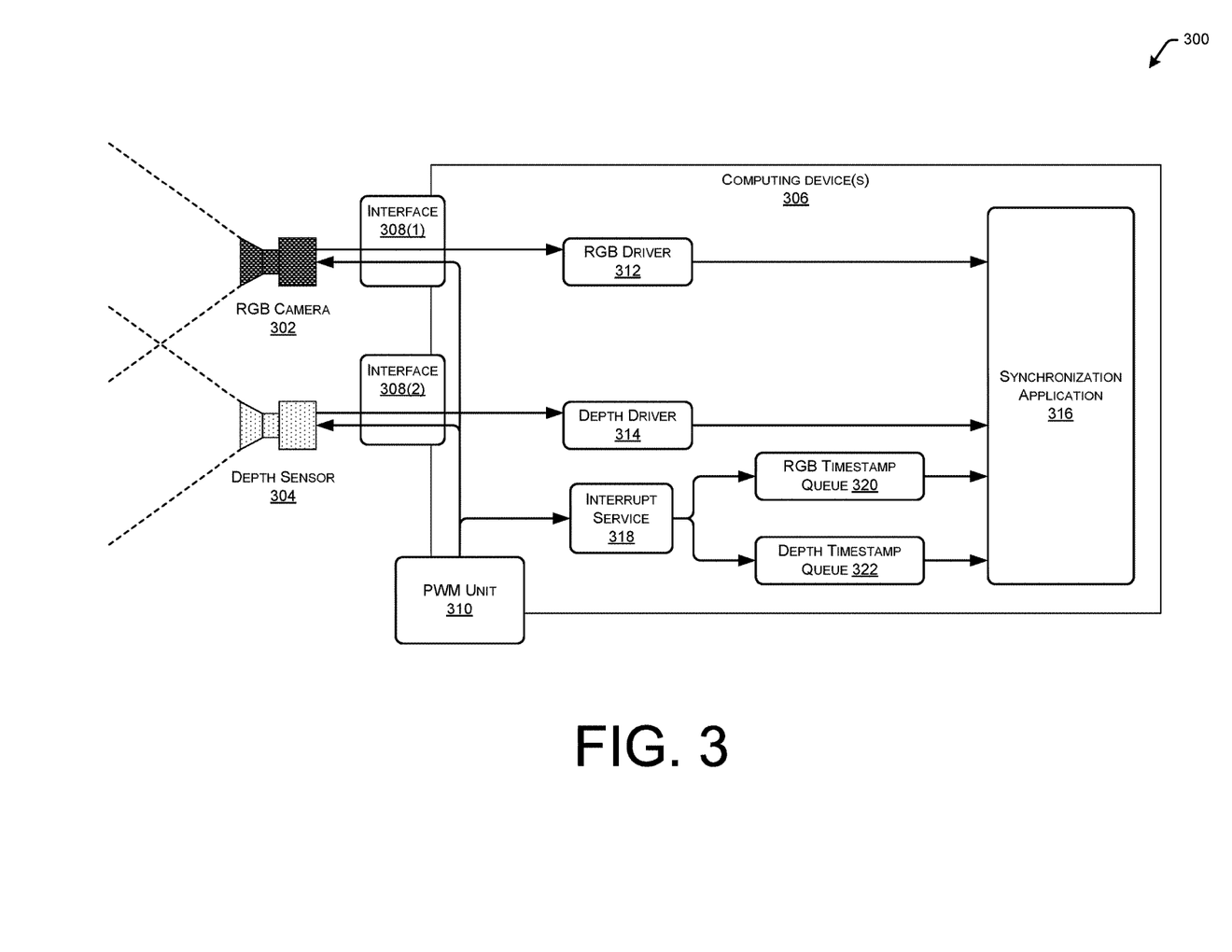
FIG. 3 illustrates an example system in which images (e.g., video) of an environment from a first camera may be synchronized with images of the environment from a second video sensor. For instance, a depth sensor may capture a series of images, which may be temporally aligned with images captured by an RGB camera, thus allowing for the creation of a three-dimensional (3D) model of the environment.

FIG. 3 illustrates an example system 300 in which images (e.g., video) of an environment from a first camera (here, an RGB camera 302) may be synchronized with images of the environment from a second video sensor (in this example, a depth sensor 304). As illustrated, the RGB camera 302 couples to a computing device 306 (representing one or more computing devices, such as those hosting the inventory management system 122) via a first interface 308(1). The interface 308(1) may comprise a USB interface, a DSI interface, or any other type of interface utilizing any type of protocol. The depth sensor 304, meanwhile, may couple to the computing device 306 via a second interface 308(2). Again, the interface 308(2) may comprise a USB interface, a DSI interface, or any other type of interface utilizing any type of protocol. In some instance, the interfaces 308(1) an 308(2) represent different interfaces utilizing different protocols and, hence, different data transfer rates and the like.

As illustrated, the computing device 306 further includes, in this example, a PWM unit 310, which may be implemented in hardware, software, or a combination thereof. Also as illustrated, the RGB camera 302 and the depth sensor 304 couple to a common pin of the PWM unit. In some instances, the PWM unit is configured to generate periodic pulses according to a predefined frequency, while the RGB camera 302 and the depth sensor 304 are configured to acquire respective images in response to receiving a pulse from the PWM unit. Further, because the RGB camera 302 and the depth sensor 304 couple to the PWM unit via the common output pin, the RGB camera 302 and the depth camera 304 receive these pulses substantially contemporaneously and, therefore, are configured to acquire respective images at substantially the same time.

In response to detecting a pulse from the PWM unit and acquiring a color image of the environment, the RGB camera 302 is configured to send this image to a corresponding RGB driver 312 via the interface 308(1). Similarly, in response to detecting the pulse from the PWM unit and acquiring a depth image of the environment, the depth sensor 304 is configured to send this depth image to a corresponding depth driver 314 via the interface 308(2). The respective drivers may process the received images and, when complete may provide these images down the pipeline, in this example to a synchronization application 316.

In addition, the computing device 306 includes an interrupt service 318. Initially, the interrupt service 318 may create an RGB timestamp queue 320 and a depth timestamp queue 322. While in this example the interrupt service 318 generates two timestamp queues, it is to be appreciated that in other instances the interrupt service 318 may generate a number of timestamp queues equal to the number of sensors for which respective data streams are being aligned. Further, the queues 320 and 322 may comprise respective data structures in respective portions of memory of the computing device, queues implemented in hardware, or a combination thereof.

After creating the queues, the interrupt service 318 is called by the processor as described above in response to an interrupt being generated based on the pulse being generated by the PWM unit. In response to being called, the interrupt service 318 determines a current time using a clock of the computing device 306 and generates a timestamp specifying the current time for each timestamp queue. That is, in this example, the interrupt service 318 generates a first timestamp specifying the current time and stores this first timestamp in the RGB timestamp queue 320. Similarly, the interrupt service 318 generates a second timestamp specifying the current time and stores this second timestamp in the depth timestamp queue 322. Because the pulse and the interrupt occur substantially simultaneously, the RGB camera 302, the depth sensor 304, and the interrupt service 318 may perform their respective operations substantially simultaneously. While the a above example describes a timestamp as a current time, in other instances the timestamps may implemented as an atomically increasing count (e.g., 1, 2, 3, etc.) which may be used to align images stored in the different queues in the same manner as time-of-day indications may be used.

Further, while the above example describes a single pulse, as the PWM unit continues to generate pulses, the RGB camera 302 continues to acquire respective images, as does the depth sensor 304. Further, the interrupt service may continue to fill the queues upon receiving respective interrupts.

After the RGB driver 312 finishes a particular image, the RGB driver 312 provides this image to the synchronization application 316. Upon receiving the color image, the application 316 retrieves the first timestamp from the RGB timestamp queue 320, which operates as a FIFO queue. The synchronization application 316 then associates the first timestamp with the color image by, for example, appending the first timestamp to a header portion of the color image. Similarly, when the depth driver 314 finishes processing a particular depth image, the driver 314 may provide this image to the synchronization application 316. In response, the application 316 retrieves the second timestamp (i.e., the next-in-line timestamp in the queue) from the depth timestamp queue 322, which also operates as a FIFO queue. The synchronization application 316 then associates the second timestamp with the depth image by, for example, appending the second timestamp to a header portion of the depth image. Because the first and second timestamps specify the same time, both the color image and the depth image—captured substantially simultaneously—are not timestamped with the same time. By performing this process on subsequent images captured by the RGB camera 302 and the depth sensor 304, the synchronization application 316 aligns the video captured by these independent cameras.

In some instances, the synchronization application 316 may determine to restart the alignment process. That is, because errors may occur in the processing of the images during the image-processing pipeline, the data streams may become misaligned. In this regard, the synchronization application 316 may utilize an algorithm that determines when to restart the process based on the current state of the RGB timestamp queue 320 and the current state of the depth timestamp queue 322. For instance, this algorithm may take into account the differential between the amount of timestamps in each queue as well as the amount of time that these queues have had a differential. That is, if the queues have a same number of timestamps stored at a particular time, then the algorithm may determine that the process is healthy. If, however, the algorithm calculates that a large disparity exists in the number of stored timestamps in one queue relative to the other and/or that a differential has existed for a relatively long amount of time, then the process may be determined to need restarting. It is to be appreciated that the amount of imbalance between the queues and the amount of time may vary depending upon implementation details.

When the synchronization application 316 determines to restart the synchronization process, the synchronization application 316 may send a first instruction to the PWM unit 310 to cease generating pulses—and, hence, ceasing the sensors from capturing further data frames. The synchronization application 316 may then empty each queue (e.g., in this example the RGB and depth timestamp queues) and, thereafter, may send a second instruction to the PWM unit 310 to again begin generating pulses. Finally, while the above example illustrates and describes the components of the system in a single device, it is to be appreciated that these components may be distributed across any number of devices residing in any number of environments.

Figure 4:
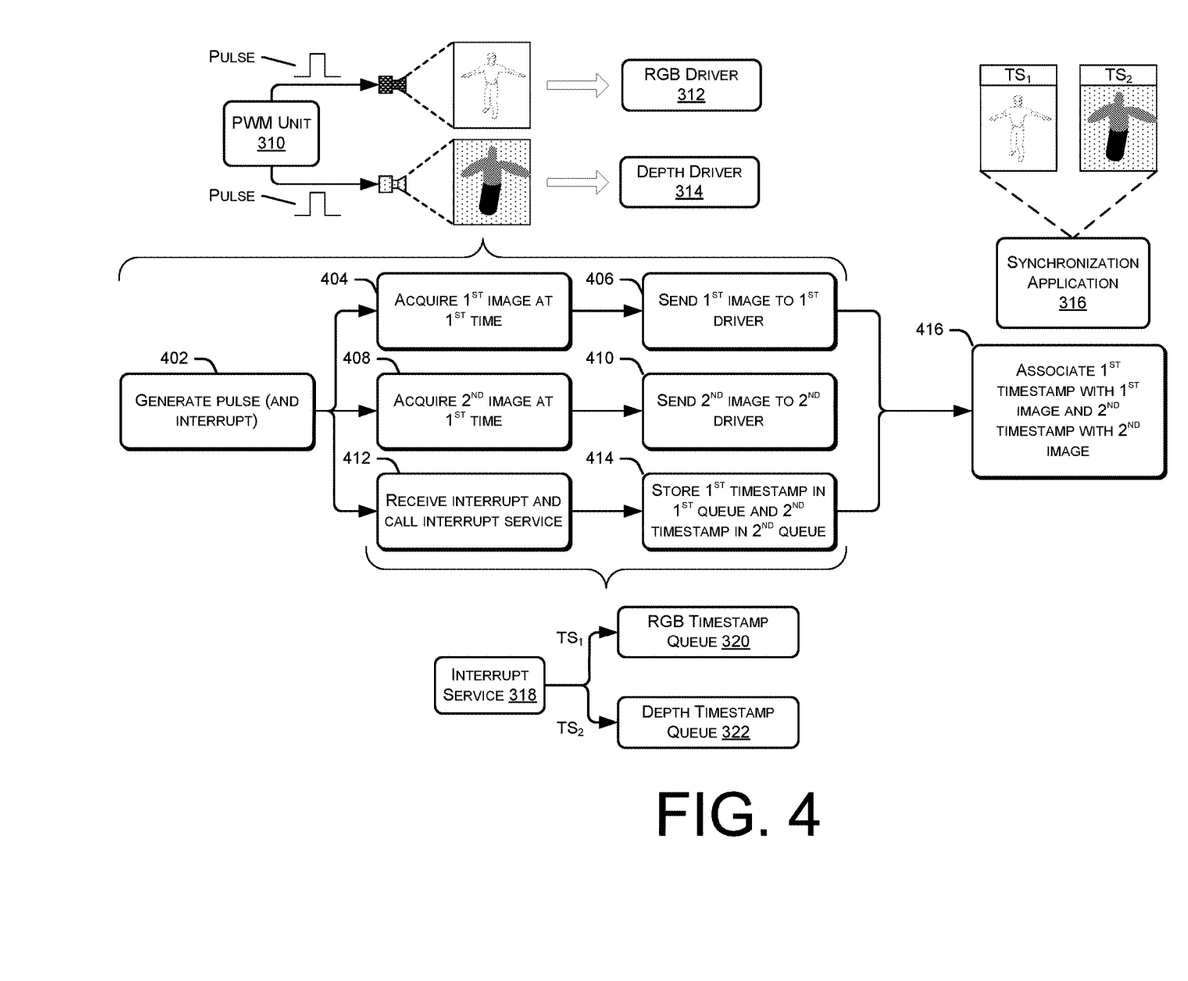
FIG. 4 illustrates a flow diagram of an example process for synchronizing images of a first camera with images of a second camera using the example system of FIG. 3.

FIG. 4 illustrates a flow diagram of an example process 400 for synchronizing images of a first camera with images of a second camera using the example system of FIG. 3. The process 400, and each process described herein, is illustrated as a collection of blocks in a logical flow graph, which represent a sequence of operations that can be implemented in hardware, software, or a combination thereof. In the context of software, the blocks represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 402, the PWM unit 310 generates a pulse, resulting in the generation of a corresponding interrupt that is detected by the processor. As noted above, the PWM unit couples to the example RGB sensor 302 and the example depth sensor 310 via a common line. As such, at 404 the RGB camera 302 detects the pulse and acquires a first image of the environment at a first time. At 406, the RGB camera sends this first image to its RGB driver 312. Simultaneously as the RGB camera 302 capturing the first image, at 408 the depth sensor 304 captures a second image of the environment at the first time. At 410, the depth sensor 304 sends this second image to its depth sensor 314.

Further, as the cameras are detecting the pulse, the interrupt service 318 is being called in response to the interrupt generated based on the pulse. Therefore, an operation 412 represents receiving the interrupt and calling the interrupt service 318. In response to being called, at 414 the interrupt service generates first and second timestamp queues, both specifying the same, current time corresponding to the first time, and stores the first timestamp in the RGB timestamp queue 312 and the second timestamp in the depth timestamp queue 314.

At 416, the synchronization application receives the first image and, at the same time or at a different time, receives the second image. In response to receiving the first image, the synchronization application 316 obtains the next-in-line timestamp from the RGB timestamp queue 312 (in this instance, the first timestamp). The application 316 then associates the first timestamp with the first image, such as by appending it to the header of the first image. Similarly, upon receiving the second image, the synchronization application 316 obtains the next-in-line timestamp from the depth timestamp queue 314 (in this instance, the first timestamp). The application 316 then associates the second timestamp with the second image, such as by appending it to the header of the second image. This process may repeat, thus aligning the images acquired by the RGB camera with the images acquired by the depth sensor via the accurate timestamping.

Figure 5A:
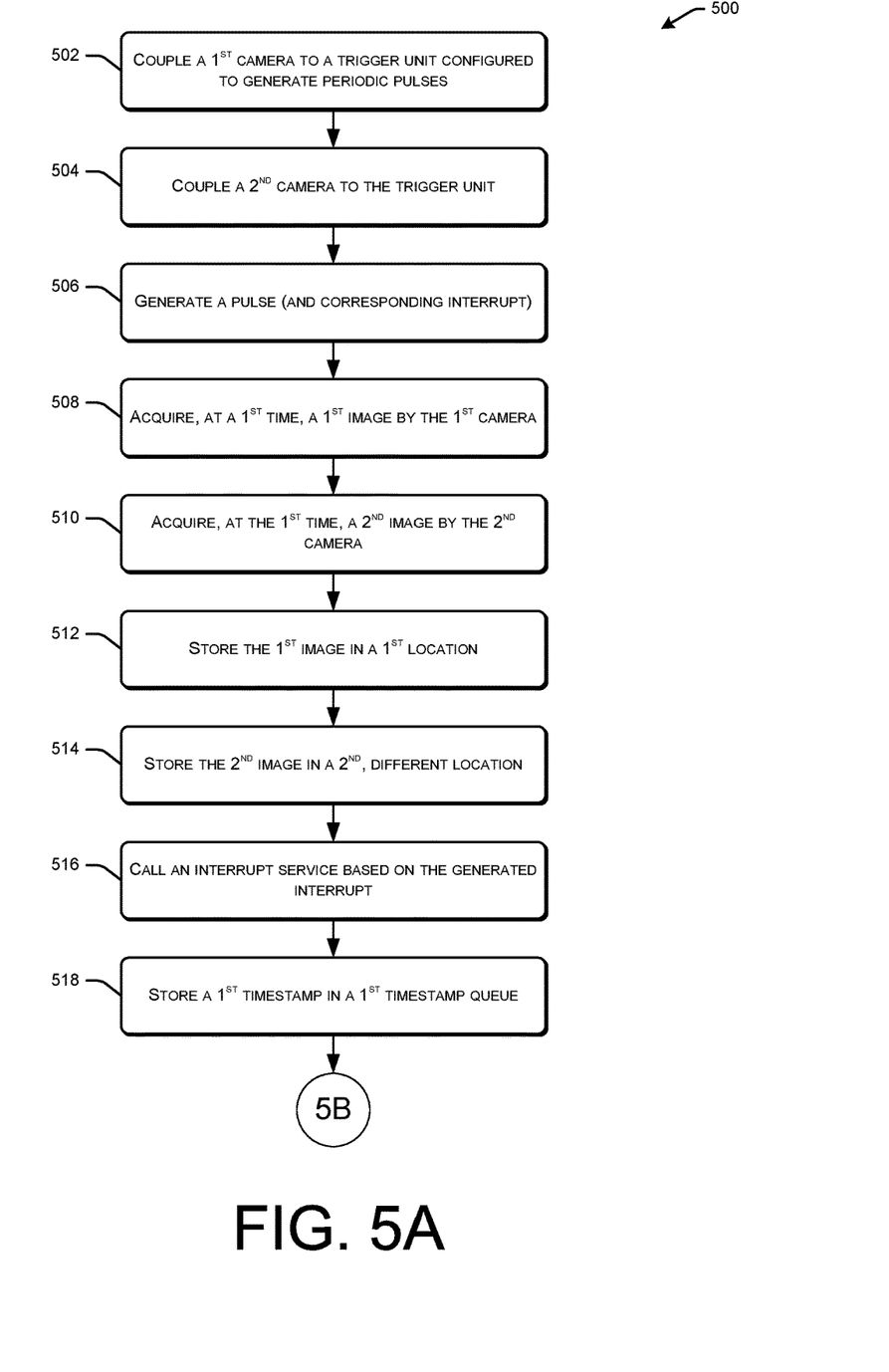
FIGS. 5A-C collectively illustrate a flow diagram of another example process for synchronizing images from of a first camera with images of a second camera. While this processes and others described herein illustrates the synchronization of data streams from two camera, in some instances the techniques may equally apply to synchronize any number of cameras. Further, the techniques may equally apply to synchronization of other types of data streams (e.g., audio data streams, data streams from weight sensors, etc.).
Figure 5B:
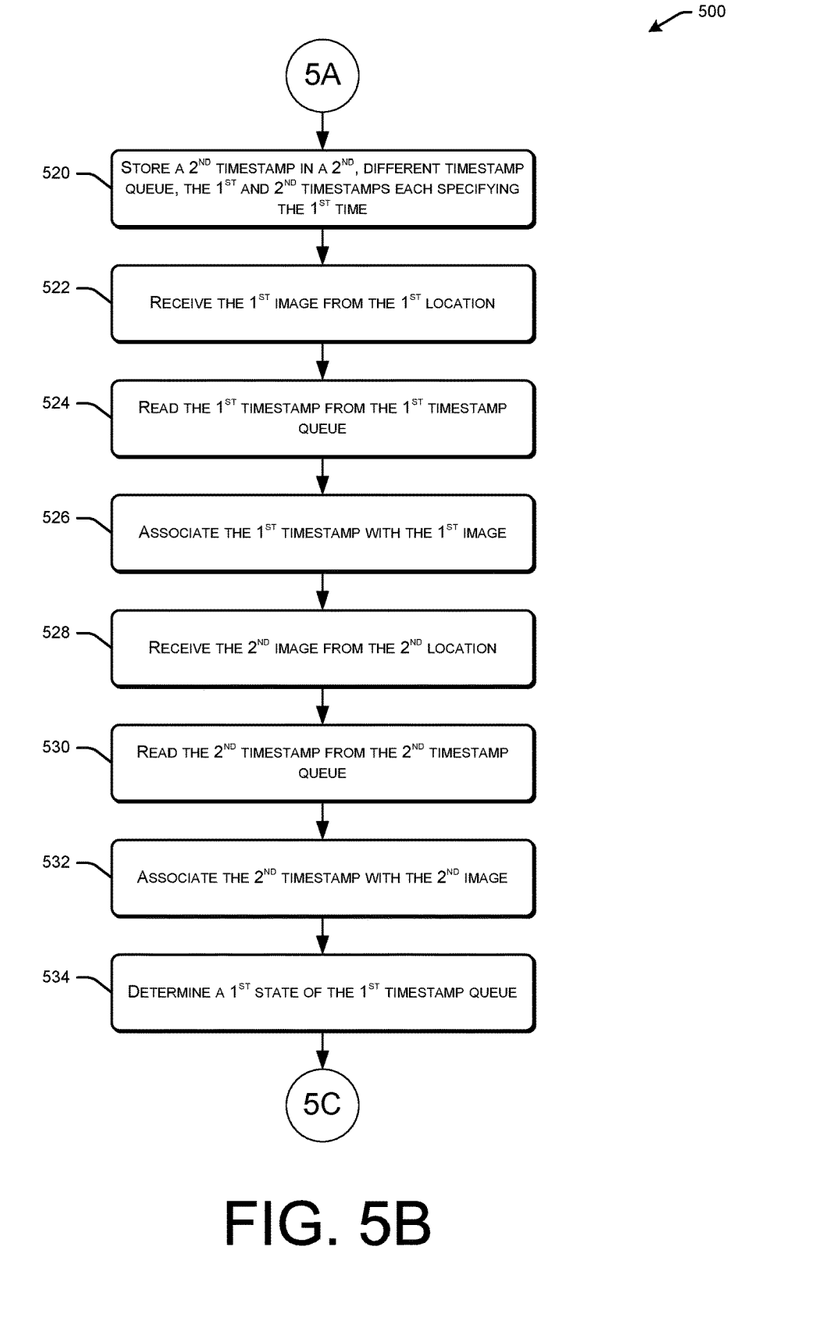
Figure 5C:
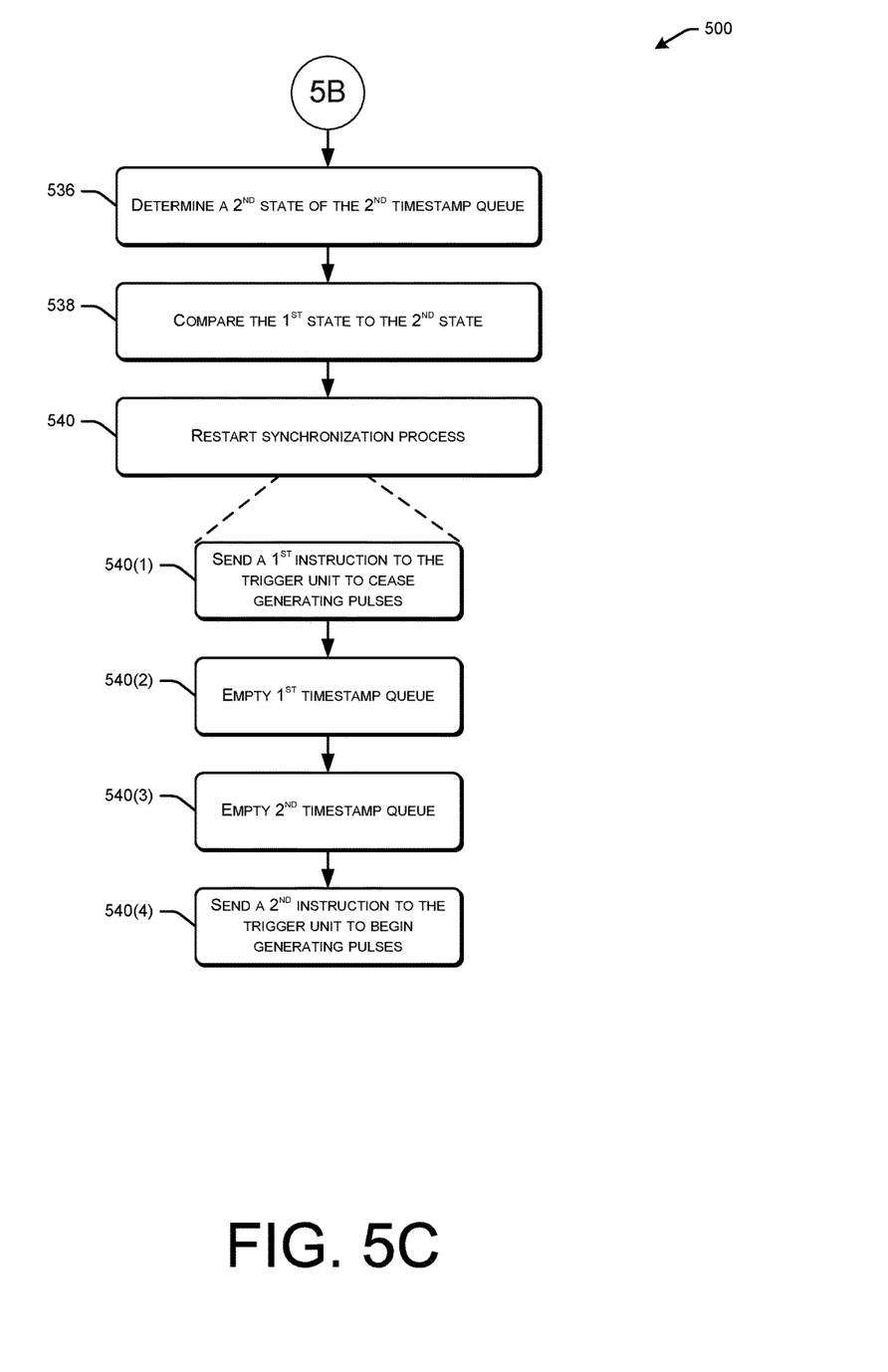

FIGS. 5A-C collectively illustrate a flow diagram of another example process 500 for synchronizing images from a first camera with images from a second camera. While this processes and others described herein illustrates the synchronization of data streams from two camera, in some instances the techniques may equally apply to synchronize any number of cameras. Further, the techniques may equally apply to synchronization of other types of data streams (e.g., audio data streams, data streams from weight sensors, etc.).

At 502, a first camera is coupled to a trigger unit (e.g., a PWM unit) that is configured to generate periodic pulses. At 504, a second camera is coupled to the trigger unit, potentially via a common communication channel (e.g., to the same output pin of a PWM unit) as the first camera such that both cameras receive the pulses generated by the trigger unit substantially simultaneously. At 506, the trigger unit generates a first pulse, resulting in the generation of a corresponding first interrupt that is sent to and received by the processor. At 508, in response to detecting the first pulse, the first camera captures a first image at a first time. Similarly, at 510, in response to detecting the first pulse, the second camera captures a second image at the first time.

At 512, the first image is stored at a first location, such as location associated with a particular driver of the first camera. At 514, the second image is stored at a second, different location, such as a location associated with a particular, different driver of the second camera. At 516, in response to detecting the interrupt generated by the trigger unit, the processor invokes the interrupt service. Upon invocation, at 518 the interrupt service stores a first timestamp, specifying the first time, in a first timestamp queue.

FIG. 5B continues the illustration of the process 500 and includes, at 520, the interrupt service storing a second timestamp, specifying the first time, in a second, different timestamp queue. At 522, a synchronization application receives the first image from the first location, potentially after the first driver has finished processing this image. At 524, and in response, the application reads the first timestamp data from the first timestamp queue and, at 526, associates the first timestamp specifying the first time with the first image. As described above, the application may read, from the first timestamp queue, the least-recent timestamp—that is, the timestamp that was first placed in the queue. At 528, the synchronization application receives the second image from the second location, potentially after the second driver has finished processing this image. At 530, and in response, the application reads the second timestamp data from the second timestamp queue and, at 532, associates the second timestamp specifying the first time with the second image. As described above, the application may read, from the second timestamp queue, the least-recent timestamp—that is, the timestamp that was first placed in the second queue.

At 534, meanwhile, the synchronization application may determine a first state of the first timestamp queue. This may include determining a current number of timestamps currently stored in the queue, potentially along with the respective times associated with these timestamps.

FIG. 5C concludes the illustration of the process 500 and includes, at 536, determining a second state of the second timestamp queue. Again, this may include determining a current number of timestamps currently stored in the queue, potentially along with the respective times associated with these timestamps. At 538, the application compares the first state to the second state to determine whether the synchronization process should be restarted. In some instances, the application determines whether or not to restart the process periodically or in response to a particular trigger. In this particular example, the synchronization application determines at 540 that the process should be restarted. In some instances, restarting the process may include sub-operations 540(1)-(4). At 540(1), the applications sends a first instruction to the trigger unit to cease generating pulses. At 540(2), the application empties the first timestamp queue and, at 540(3), empties the second timestamp queue. That is, the application may delete any contents of these queues stored in memory. Finally, at 540(4), the synchronization application may send a second instruction to the trigger unit, instructing the trigger unit to begin generating pulses.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a first camera configured to generate depth data of an environment based on acquired depth images;
 a second camera configured to acquire color images of the environment;
 a computing device coupled to the first camera and the second camera, the computing device comprising:
  a pulse-width-modulation (PWM) unit coupled to the first camera and the second camera and configured to generate a pulse and an interrupt at a first time;
  one or more processors to receive the interrupt;
  memory, coupled to the one or more processors;
  a first driver stored in the memory and executable on the one or more processors to receive a depth image acquired by the first camera, the first camera configured to acquire the first depth image in response to receiving the pulse from the PWM unit;
a second driver stored in the memory and executable on the one or more processors to receive a color image acquired by the second camera, the second camera acquiring the color image in response to receiving the pulse from the PWM unit;
a first timestamp queue for storing, in the memory, timestamps for association with depth images acquired by the first camera;
a second timestamp queue for storing, in the memory, timestamps for association with color images acquired by the second camera;
an interrupt service stored in the memory and executable on the one or more processors to:
receive a call from the one or more processors in response to the one or more processors receiving the interrupt;
store, in response to receiving the call: (i) a first timestamp corresponding to the first time in the first timestamp queue, and (ii) a second timestamp corresponding to the first time in the second timestamp queue;
an application stored in the memory and executable on the one or more processors to:
receive the depth image from the first driver;
read the first timestamp from the first timestamp queue;
add metadata that is based on the first timestamp to the depth image;
receive the color image from the second driver;
read the second timestamp from the second timestamp queue; and
add metadata that based on the second timestamp to the color image.

2. The system as recited in claim 1, wherein:
the pulse comprises a first pulse;
the interrupt comprises a first interrupt;
the PWM unit is further configured to generate a second pulse and a second interrupt at a second time;
the depth image comprises a first depth image;
the first driver is further to receive a second depth image acquired by the first camera, the first camera configured to acquire the second depth image in response to receiving the second pulse;
the color image comprises a first color image;
the second driver is further to receive a second color image acquired by the second camera, the second camera configured to acquire the second color image in response to receiving the second pulse;
the call comprises a first call;
the interrupt service is further executable on the one or more processors to:
receive a second call from the one or more processors in response to the one or more processors receiving second interrupt; and
store, in response to receiving the second call: (i) a third timestamp corresponding to the second time in the first timestamp queue, and (ii) a fourth timestamp corresponding to the second time in the second timestamp queue; and
the application is further executable on the one or more processors to:
receive the second depth image from the first driver;
read the third timestamp from the first timestamp queue;
add metadata that is based on the third timestamp to the second depth image;
receive the second color image from the second driver;
read the fourth timestamp from the second timestamp queue; and
add metadata that is based on the fourth timestamp to the second color image.

3. The system as recited in claim 1, wherein the application is further executable on the one or more processors to:
determine a first state of the first timestamp queue;
determine a second state of the second timestamp queue;
compare the first state to the second state;
based at least in part the comparing:
send a first instruction to the PWM unit to cease generating pulses;
empty the first timestamp queue;
empty the second timestamp queue; and
send a second instruction to the PWM unit to begin generating pulses.

4. A method comprising:
generating, at a first time, a pulse by a trigger unit configured to generate periodic pluses, the trigger unit coupled to a first camera and to a second camera;
receiving, by the first camera, the pulse generated at the first time;
receiving, by the second camera, the pulse generated at the first time;
acquiring first image data by the first camera at least partly in response to receiving the pulse;
acquiring second image data by the second camera at least partly in response to receiving the pulse;
storing, by one or more processors of a computing device, the first image data in a first location;
storing, by the one or more processors, the second image data in a second location;
storing, in a first timestamp queue and by the one or more processors, a first timestamp that is based at least in part on the first time;
storing, in a second timestamp queue and by the one or more processors, a second timestamp that is based at least in part on the first time;
receiving the first image data from the first location;
reading the first timestamp from the first timestamp queue;
associating the first timestamp with the first image data;
receiving the second image data from the second location;
reading the second timestamp from the second timestamp queue; and
associating the second timestamp with the second image data.

5. The method as recited in claim 4, wherein the pulse comprises a first pulse, and further comprising:
generating, at a second time, a second pulse by the trigger unit;
acquiring third image data by the first camera;
acquiring fourth image data by the second camera;
storing the third image data in the first location;
storing the fourth image data in the second location;
storing, in the first timestamp queue, a third timestamp that is based at least in part on the second time;
storing, in the second timestamp queue, a fourth timestamp that is based at least in part on the second time;
receiving the third image data from the first location;
reading the third timestamp from the first timestamp queue;
associating the third timestamp with the third image data;

receiving the fourth image data from the second location;
reading the fourth timestamp from the second timestamp queue; and
associating the fourth timestamp with the fourth image data.

6. The method as recited in claim 4, further comprising:
receiving, by one or more processors, an interrupt generated by the trigger unit substantially contemporaneously with the generating of the pulse; and
calling, by the one or more processors, an interrupt service at least partly in response to the receiving of the interrupt;
and wherein:
   the storing the first timestamp comprises storing the first timestamp in the first timestamp queue by the interrupt service at least partly in response to the calling; and
   the storing the second timestamp comprises storing the second timestamp in the second timestamp queue by the interrupt service at least partly in response to the calling.

7. The method as recited in claim 4, wherein:
the coupling the first camera comprises coupling the first camera to the trigger unit via a first communication channel;
the coupling the second camera comprises coupling the second camera the trigger unit via the first communication channel; and
the generating the pulse comprises generating the pulse by the trigger unit such that the first camera receives the pulse via the first communication channel substantially contemporaneously with the second camera receiving the pulse via the first communication channel.

8. The method as recited in claim 4, wherein the associating the first timestamp with the first image data comprises storing the first timestamp as metadata associated with the first image data.

9. The method as recited in claim 4, wherein the acquiring the first image data comprises acquiring the first image data of an environment by a depth sensor, the acquiring the second image data comprises acquiring the second image data of the environment by an RGB camera, and the method further comprising:
   determining, based at least in part on the first and second timestamps, that the first image data temporally aligns with the second image data; and
   generating a three-dimensional (3D) model of the environment using at least the first image data and the second image data.

10. The method as recited in claim 4, further comprising:
determining a first state of the first timestamp queue;
determining a second state of the second timestamp queue;
comparing the first state to the second state;
based at least in part the comparing:
   sending a first instruction to cause the first camera and the second camera to cease acquiring image data;
   emptying the first timestamp queue;
   emptying the second timestamp queue; and
   sending a second instruction to cause the first camera and the second camera to begin acquiring image data.

11. A system comprising:
a first sensor;
a second sensor;
a trigger unit coupled to the first sensor and the second sensor and configured to generate a pulse;
one or more processors; and
one or more computer-readable media storing computer-executable instructions that, when executed on the one or more processors, cause the one or more processors to perform acts comprising:
   acquiring, at a first time, first data using the first sensor at least partly in response to the first sensor receiving the pulse;
   acquiring, at or approximately at the first time, second data using the second sensor at least partly in response to the second sensor receiving the pulse;
   storing the first data in a first location;
   storing the second data in a second location;
   storing, in a first timestamp queue, a first timestamp specifying the first time;
   storing, in a second timestamp queue, a second timestamp specifying the first time or approximately the first time;
   receiving the first data from the first location;
   reading the first timestamp from the first timestamp queue;
   associating the first timestamp with the first data;
   receiving the second data from the second location;
   reading the second timestamp from the second timestamp queue; and
   associating the second timestamp with the second data.

12. The system as recited in claim 11, wherein the trigger unit comprises a pulse-width-modulation (PWM) unit.

13. The system as recited in claim 12, wherein the pulse comprises a first pulse, the PWM unit is further configured to generate a second pulse at a second time, and the acts further comprise:
   receiving, by the first sensor, the second pulse generated at the second time;
   receiving, by the second sensor, the second pulse generated at the second time;
   acquiring third data by the first sensor;
   acquiring fourth data by the second sensor;
   storing the third data in the first location;
   storing the fourth data in the second location;
   storing, in the first timestamp queue, a third timestamp that is based at least in part on the second time;
   storing, in the second timestamp queue, a fourth timestamp that is based at least in part on the second time;
   receiving the third data from the first location;
   reading the third timestamp from the first timestamp queue;
   associating the third timestamp with the third data;
   receiving the fourth data from the second location;
   reading the fourth timestamp from the second timestamp queue; and
   associating the fourth timestamp with the fourth data.

14. The system as recited in claim 12, the acts further comprising:
receiving, by one or more processors, an interrupt generated by the PWM unit substantially contemporaneously with the generating of the pulse; and
calling, by the one or more processors, an interrupt service at least partly in response to the receiving of the interrupt;
and wherein:
   the storing the first timestamp comprises storing the first timestamp in the first timestamp queue by the interrupt service at least partly in response to the calling; and the storing the second timestamp comprises storing the second timestamp in the second timestamp queue by the interrupt service at least partly in response to the calling.

15. The system as recited in claim 12, wherein the PWM unit couples to the first and second sensors via a common output pin of the PWM unit such that the first sensor receives the pulse substantially contemporaneously with the second sensor receiving the pulse.

16. The system as recited in claim 11, wherein the first sensor comprises a first camera, and the second sensor comprise a second camera.

17. The system as recited in claim 11, wherein the first sensor comprises a depth sensor and the second sensor comprises an RGB camera, and the acts further comprising:
    determining, based at least in part on the first and second timestamps, that the first data temporally aligns with the second data; and
    generating a three-dimensional (3D) model of the environment using at least the first data and the second data.

18. The system as recited in claim 11, the acts further comprising:
    determining a first state of the first timestamp queue;
    determining a second state of the second timestamp queue;
    comparing the first state to the second state;
    based at least in part the comparing:
        sending a first instruction to cause the first sensor and the second sensor to cease acquiring data;
        emptying the first timestamp queue;
        emptying the second timestamp queue; and
        sending a second instruction to cause the first sensor and the second sensor to begin acquiring data.

* * * * *